WHEELER & BAZIN.
Stereoscope.

No. 40,798. Patented Dec. 1, 1863.

witnesses
J W Coombs
M M Livingston

Inventor
C W Wheeler
A A Bazin
per Munn & Co
Attorneys

N. PETERS, Photo-Lithographer, Washington, D. C.

UNITED STATES PATENT OFFICE.

CHAS. H. WHEELER, OF WEST ROXBURY, AND JAMES A. BAZIN, OF CANTON, MASSACHUSETTS, ASSIGNORS TO CHARLES H. WHEELER AFORESAID.

STEREOSCOPE.

Specification forming part of Letters Patent No. 40,798, dated December 1, 1863.

*To all whom it may concern:*

Be it known that we, CHARLES H. WHEELER, of West Roxbury, and JAMES A. BAZIN, of Canton, both in the county of Norfolk and State of Massachusetts, have invented a new and useful Improvement in Stereoscopes; and we do hereby declare that the following is a full, clear, and exact description of the same, reference being had to the accompanying drawings, forming a part of this specification, in which—

Figure 1:
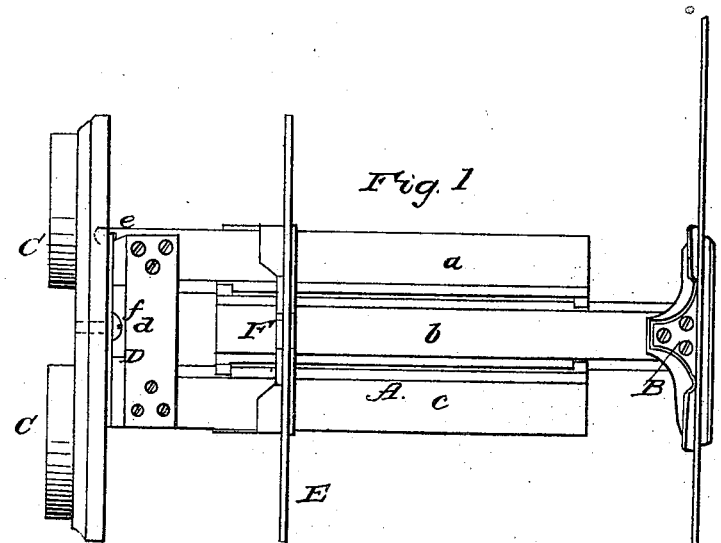
Figure 2:
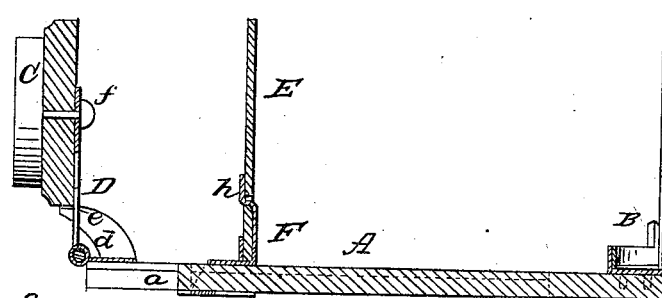
Figure 3:
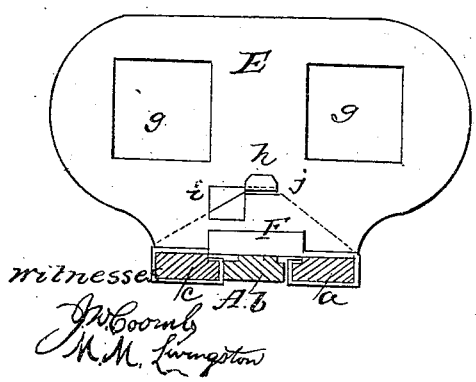
Figure 4:
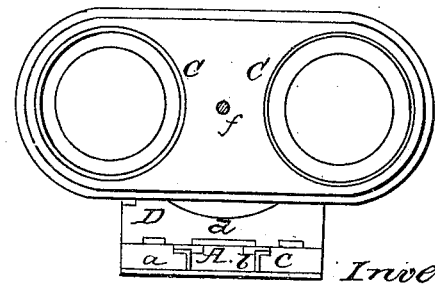

Figure 1 represents a plan or top view of our invention. Fig. 2 is a longitudinal vertical section of the same. Fig. 3 is a transverse vertical section of the same. Fig. 4 is a front elevation of the same.

Similar letters in the several views refer to corresponding parts.

The object of this invention is to arrange a stereoscopic instrument, so that the same, when not used, can be conveniently folded up in a small compass, and when unfolded for use the picture can be readily shifted and brought in the proper focus to correspond to different eyes, and the field-piece can be adjusted to a corresponding position.

The invention consists in a board or bed-plate, being provided with a hinged pair of eyeglasses and with a longitudinally-sliding picture-holder, in such a manner that the eyeglasses can be turned up to a position at right angles with the bed-plate when the instrument is to be used, and down flat on said bed-plate when the instrument is not used; and, furthermore, the picture-holder with the picture can be readily adjusted to any desired focus.

It consists, further, in combining with the hinged eyeglasses and adjustable picture-holder a longitudinally-sliding field-piece, which can be readily adjusted to suit different pictures and different eyes; also, in connecting the eyeglasses to the hinged head-piece by means of a pivot, in such a manner that, when the instrument is not used said eyeglasses can be turned in line with the bed-plate and the instrument can be brought in a convenient form to be put in the pocket or stored away in a box; also, in the arrangement of a spring-stop, in combination with the head-piece, to which the eyeglasses are hinged in such a manner that said head-piece, when turned up to a position at right angles with the bed-plate, is firmly retained and prevented from turning down spontaneously or by accident. Finally, in constructing the bed-plate out of two or more parts, and combining said parts with each other and with the picture-holder in such a manner that one part of the bed-plate having the picture-holder attached to it slides in and out, and that by the motion of this part the focus can be adjusted, and when the instrument is not used the length of the bed-plate can be reduced to a small compass.

To enable those skilled in the art to make and use our invention, we will proceed to describe it.

A represents a piece of wood or metal, or any other suitable material, which forms the bed-plate of our instrument. This bed-plate is made of three (more or less) parts, *a b c*, which are connected together so that the part *b* slides between the parts *a c*, and that said sliding part can be drawn in or out at pleasure.

B is the picture-holder, which consists of an angular bracket with two springs extending in opposite directions to retain the picture. This holder is firmly fastened to the end of the slide *b*, opposite to the eyeglasses C, which are attached to a head-piece, D, that is hinged to the ends of the ways *a c*. The holder moves in and out with the slide *b*, and can thus be brought closer to or farther from the eyeglasses, in order to obtain the proper focus.

Instead of attaching the picture-holder to the slide *b*, the bed-plate may be made in one piece and the picture-holder so arranged that it slides on it toward or from the eyeglasses; but it is obvious that, in order to be able to move the picture to the desired distance from the eyeglasses, the bed-plate has to be made twice as long, or nearly so, as it will be when provided with a slide, *b*, and ways *a c*, as previously described and shown in the drawings. By the use of the slide the length of the bed-plate and the distance of the picture from the eyeglasses can be increased to any desired degree; and if the instrument is not used the length of the bed-plate can be reduced, so that the whole can be stored in a small compass.

The head-piece D, which retains the eyeglasses, is connected to the end of the bed-plate A, opposite the picture-holder, by a hinge, $d$, and from the stationary bracket of this hinge rises a notched-arm, $e$, which forms a spring-catch to retain the head-piece, with the eyeglasses, in a position at right angles to the bed-plate when the instrument is to be used.

When not used, the eyeglasses, with the head-piece, are turned down flat on the surface of the bed-plate; and in order to reduce still further the space occupied by the instrument when the same is not used the eyeglasses are connected to the head-piece by a pivot, $f$, so that the same can be turned in line with the bed-plate.

When the instrument is to be used, the head-piece is turned up until it is retained by the spring-catch $e$, the eyeglasses are turned to the position shown in Figs. 1 and 4, and one picture after the other is inserted into the holder B, the focus being adjusted for each picture and observer.

The effect of the various pictures is considerably improved by the field-piece E, which is made of card-board, or any other suitable material, and provided with two square openings, $g$, to confine the sight of each eye to its own picture. The field-piece is attached to a slide, F, which is adjustable on the bed-plate A, so that the same can be brought in the proper position for each picture. The slide F is provided with a hook, $h$, which passes through a hole, $i$, in the lower part of the field-piece, and retains the same by catching in a slot, $j$, which extends from the hole $i$. When the instrument is not used, the field-piece can be readily removed.

This instrument is exceedingly simple in its construction; it can be made cheaply, and it can be adjusted to every eye with far more facility than the most complicated and costly instruments.

What we claim as new, and desire to secure by Letters Patent, is—

1. The board or bed-plate A, in combination with the hinged eyeglasses C, and longitudinally-sliding picture-holder B, constructed and operating in the manner and for the purpose substantially as shown and described.

2. The longitudinally-sliding adjustable field-piece E, in combination with the bed-plate A, hinged eyeglasses C, and adjustable picture-holder B, as and for the purposes set forth.

3. Connecting the eyeglasses C to the head-piece D by means of a pivot, $f$, substantially as and for the purpose described.

4. The spring-catch $e$, in combination with the hinged head-piece D, bed-plate A, and eyeglasses C, constructed and operating as and for the purpose set forth.

5. The combination of the parts $a\ b\ c$ of the bed-plate with each other and with the picture-holder B, substantially as and for the purpose herein set forth.

CHARLES H. WHEELER.
JAMES A. BAZIN.

Witnesses:
ALFRED H. COLBURN,
S. O. THAYER.